United States Patent [19]

Meyers

[11] 4,088,392
[45] May 9, 1978

[54] ELECTROCHROMIC VARIABLE OPTICAL TRANSMISSION DEVICE WITH A LIQUID ELECTROLYTE

[75] Inventor: Marion Douglas Meyers, Stamford, Conn.

[73] Assignee: American Cyanamid Company, Stamford, Conn.

[21] Appl. No.: 676,601

[22] Filed: Apr. 13, 1976

Related U.S. Application Data

[63] Continuation of Ser. No. 609,251, Apr. 13, 1975, abandoned, which is a continuation of Ser. No. 41,154, May 25, 1970, abandoned.

[51] Int. Cl.$^2$ ............................................... G02F 1/36
[52] U.S. Cl. .................................................... 350/357
[58] Field of Search ................................... 350/160 R

[56] References Cited

U.S. PATENT DOCUMENTS

| | | | |
|---|---|---|---|
| 3,283,656 | 11/1966 | Jones et al. | 350/160 R |
| 3,443,859 | 5/1969 | Rogers | 350/160 R |
| 3,560,078 | 2/1971 | McIntyre et al. | 350/160 R |

*Primary Examiner*—William L. Sikes
*Attorney, Agent, or Firm*—Robert J. Feltovic; Gordon L. Hart; Bruce F. Jacobs

[57] ABSTRACT

Electro-optical device useful in control of visible and infrared absorption by windows in homes, commercial buildings and the like, typically comprising in sandwiched arrangement a pair of electrodes, and a film of a transition metal compound and a liquid electrolyte disposed between the electrodes is provided. The device exhibits coloration and bleaching thereof over large areas by control of, the polarity of an applied electric field.

7 Claims, 3 Drawing Figures

U.S. Patent    May 9, 1978    4,088,392 organic Chemistry", T. Moeller, John Wiley & Sons, Inc., New York, 1952. These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfide of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides (M representing the metal ion), e.g., $MnO$, $NiO$, $CoO$, etc.; $M_2O_3$ oxides, e.g., $Cr_2O_3$, $Fe_2O_3$, $Y_2O_3$, $Yb_2O_3$, $V_2O_4$, $Ti_2O_3$, $Mn_2O_3$, etc., $MO_2$ oxides, e.g., $TiO_2$, $MO_2$, $ThO_2$, $CrO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$, etc.; $M_4O_6$ oxides; $M_2O_7$ oxides such as $Mn_2O_7$; complex oxides such as those of the formula $XYO_2$ (X and Y being different metals), e.g. $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$ $NaWO_3$; $XYO_4$ oxides, e.g., $MgWO_4$, $CdWO_4$, $NiWO_4$, etc.; $XY_2O_6$, e.g., $CaNb_2O_6$ ("Niobite" oxides); $X_2Y_2O_6$, e.g., $Na_2Nb_2O_6$: Spinel structure oxides, i.e., of the formula $X_2YO_4$, e.g., $Na_2MoO_4$, $Ag_2MoO_4$, $Cu_2MoO_4$, $Li_2MoO_4$, $Li_2WO_4$, $Sr_2TiO_4$, $Ca_2MnO_4$, etc.; and $XY_2O_4$, e.g., $FeCr_2O_4$, $TiZn_2O_4$, etc.; $X_2YO_5$ oxides, e.g., $Fe_2TiO_5$, $Al_2TiO_5$, etc. For a discussion of some complex oxides, see Advanced Inorganic Chemistry, Cotten & Wilkinson, p. 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3.H_2O$, $WO_3.2H_2O$, $MoO_3.H_2O$ and $MoO_3.2H_2O$.

The preferred electrochromic material for use with the liquid electrolyte of the present invention is a compound which contains at least one element selected from Group VA, VIA, VIIA of the Periodic Table of the elements and at least one cation from Groups IB, IIB to VIIIB including Lanthanide and Actinide series. Particularly advantageous materials are $WO_3$ and $MoO_3$.

An important advantage of devices of the invention containing a persistent electrochromic material is applicability to large uniformly colored areas. The invention, therefore, permits numerous practical applications where control of visible and infrared absorption is desired to which prior art electro-optical devices are not susceptible as for example, windows in homes, commercial buildings and automobiles.

When the persistent electrochromic materials are employed as films, thickness desirably will be in the range of from about 0.1 to 100 microns. However, since a small potential will provide an enormous field strength across very thin films, the latter, i.e., 0.1 to 10 microns, are preferred over thicker ones. Optimum thickness will also be determined by the nature of the particular compound being laid down as films and by the film-forming method since the particular compound and film-forming method may place physical (e.g., non-uniform film surface) and economic limitations on manufacture of the devices.

The films may be laid down on any substrate which, relative to the film, is electronically conductive, such as metals or semi-conducting materials. The electronically conductive material may be coated on another suitable substrate such as glass, wood, paper, plastics, plaster, and the like, including transparent, translucent, opaque or other optical quality materials. One embodiment in the instant device could employ at least one transparent electrode, for example NESA glass (i.e. glass coated with a layer of tin oxide).

When the electric field is applied between the electrodes, a blue coloration of the previously transparent sandwich occurs, i.e., the persistent electrochromic layer becomes absorptive of electromagnetic radiation over a band encompassing the red end of the visible spectrum, thereby rendering it bluish in appearance. Prior to the application of the electric field, it was essentially non-absorbent and thus transparent.

Electrolytes

A liquid electrolyte is employed. The electrolyte can comprise an acid or salts thereof which are compatible with a counter electrode as discussed below and the electrochromic layer, such as the following:

(1) Aqueous sulfuric acid solutions ranging from 0.1 to 12.0 molar.
(2) Sulfuric acids solutions of propylene carbonate, acetonitrile, dimethyl formamide and other organic solvents compatible with sulfuric acid.
(3) Strong organic acids, such as 2-toluene sulfonic acid, in propylene carbonate and other organic solvents.
(4) Alkali metal or alkaline earth metals or rare earth metal salts, such as lithium perchlorate, nitrate, chloride, sulfate, etc., in organic solvents, such as acetonitrile and propylene carbonate.

A distinct advantage of the above-mentioned solvents is their dielectric and solubility properties leading to high conductivity and high capacity.

Counter Electrode

The cell of the instant disclosure employs a counter electrode in contact with the liquid electrolyte. Electrodes shown to be useful in sulfuric acid are described in the article entitled "Reference Electrodes in Sulfuric Acid", Electrochemical Technology, May–June 1966, pp. 275-276.

A specific example of a counter electrode compatible with sulfuric acid and used in the present invention consists of a porous lead metal plate.

Other electrodes which can be used in sulfuric acid are shown in Table I:

TABLE I

Mercury—Mercury (II) sulfate
Gold—Gold (I) oxide
Platinum—Platinum (II) oxide
Rhodium—Rhodium (III) oxide
Tungsten
Chromium (II) carbide
Zirconium—Zirconium (II) oxide
Platinum
Molybdenum
Tungsten (II) carbide

ELECTROCHROMIC VARIABLE OPTICAL TRANSMISSION DEVICE WITH A LIQUID ELECTROLYTE

This is a continuation of application Ser. No. 609,251 filed Apr. 13, 1975 which in turn is a continuation of application Ser. No. 41,154, filed May 25, 1970, both applications now abandoned.

BACKGROUND OF THE INVENTION

This invention relates to electro-optical devices and more particularly to devices whose electromagnetic radiation transmission characteristics can be selectively altered by the influence of a suitably controlled electric field. Still more particularly the invention is concerned with an electro-optical device in which a liquid electrolyte is employed in a cell containing an electrochromic material of variable oxidation states, such as tungsten oxide of titanium dioxide.

In prior U.S. applications, Ser. No. 530,086, filed Feb. 25, 1966 and Ser. No. 534,188, filed Mar. 14, 1966 and continuation-in-part applications thereof, there are described electro-optical devices exhibiting a phenomenon known as persistent electrochromism. This term denotes the property of a material whereby its electromagnetic radiation absorption characteristic is altered, in most instances even at ambient temperature, under the influence of an electric field. Such materials, for example, may exhibit little or no absorption of visible wave lengths in the absence of an electric field and therefore be transparent, but when subjected to an electric field, effectively absorb in the red end of the spectrum, turning blue in color. Similar effects can be observed in other portions of the electromagnetic radiation spectrum, invisible as well as visible.

As described in the foregoing earlier applications, if an assembly is formed wherein a layer of a persistent electrochromic material is disposed between a pair of electrodes, across which a potential is applied, the radiation transmitting characteristic of the material will change. If the electrodes and the electrochromic layer are formed on the surface of a transparent substrate, such as glass, the light transmitting characteristics of the combination can be varied by controlling the electric field produced across the electrochromic layer. Thus, if the "sandwich" of electrodes and electrochromic material on the substrate originally is clear, i.e., presenting substantially no diminution of the light transmitting ability of the substrate, application of a voltage between the electrodes to establish an electric field of the proper polarity changes the light absorption characteristic of the electrochromic material, turning it darker, for example, thus decreasing the light transmitting ability of the entire assembly.

SUMMARY OF THE INVENTION

An object of the present invention, therefore, is to provide an improved form of electrochromic device wherein a change of absorption characteristic is effected rapidly and even coloration can be obtained over large areas at low applied potential, and can be reversed perfectly, at will and at a controlled speed.

Briefly stated, the present invention adds to the prior electrode-electrochromic material sandwich, an additional layer in contact with one of the electrodes and the electrochromic material, the additional layer being of a material which can be characterized as an ionic liquid electrolyte. It has been found that when such a material is added to the prior device, not only does it permit the absorption characteristic of relatively large areas of the electrochromic material to change rapidly and uniformly under the influence of an electric field of a given polarity, even at ambient temperature, but it also renders the electrochromic layer sensitive to a field of the opposite polarity to return it positively to the absorption characteristic state is occupied prior to the initial application of the field, at a rate dependent upon the magnitude of the reverse field. In certain cases, the return to initial state may be effected at a relatively slow rate simply by providing a highly conductive, e.g., short circuit, path between the two electrodes.

The uniformity and area of coverage at which the coloration can be effected are improved in relation to the embodiments of the earlier applications and the present invention is thus suitable to a much wider range of use. Thus, the invention is applicable to mirrors, window glass, automobile windshields, and the like. The field of practical use is widened, moreover, by the low power required to induce or erase the new absorption characteristic and the discovery that the intensity of coloration is a function of current passed in this reversible cell.

The foregoing and other features, objects and advantages of the present invention will become more apparent from the following detailed description.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

DETAILED DESCRIPTION OF THE INVENTION

Electrochromic Materials

The materials which form the electrochromic materials of the device in general are electrical insulators or semiconductors. Thus are excluded those metals, metal alloys, and other metal-containing compounds which are relatively good electrical conductors.

While not wholly understood, it appears that coloration of the electrochromic materials must be accompanied by the uptake of positive counterions provided in the electrolyte.

Figure 2:
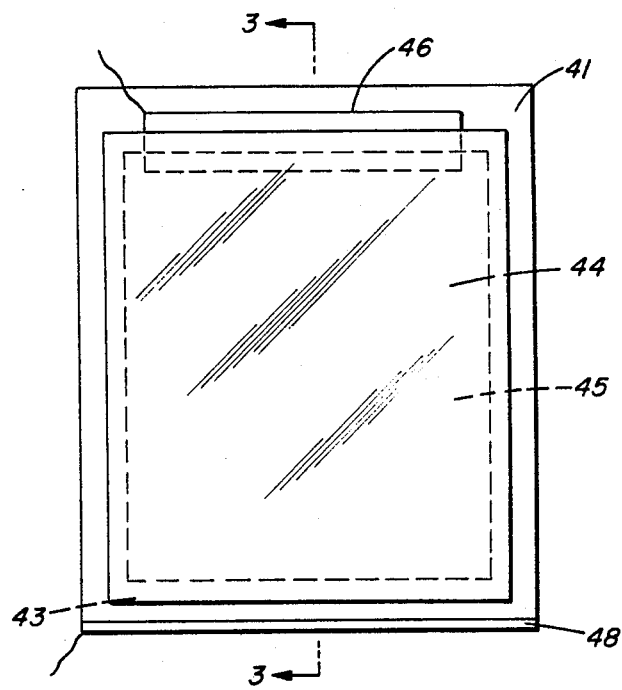
Figure 3:
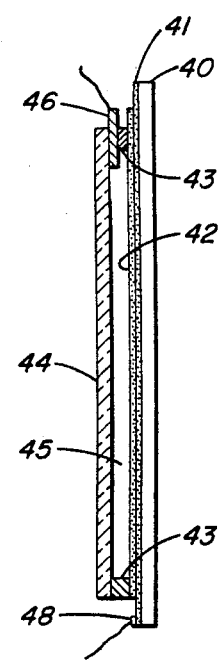

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "In- Tantalum (II) boride
Niobium
Palladium
Silicon—Silicon (II) carbide
Tantalum
Tantalum—Tantalum (V) oxide
Niobium—Niobium (V) oxide
Niobium (II) carbide
Hafnium (II) carbide The invention may be better understood by reference to the drawings in which FIG. 1 is a partial cross-sectional view of a prior electrochromic device, FIG. 2 is a plan view of an electrochromic device of the invention, and FIG. 3 is a cross-sectional view taken along the lines 3—3 of FIG. 2.

Figure 1:
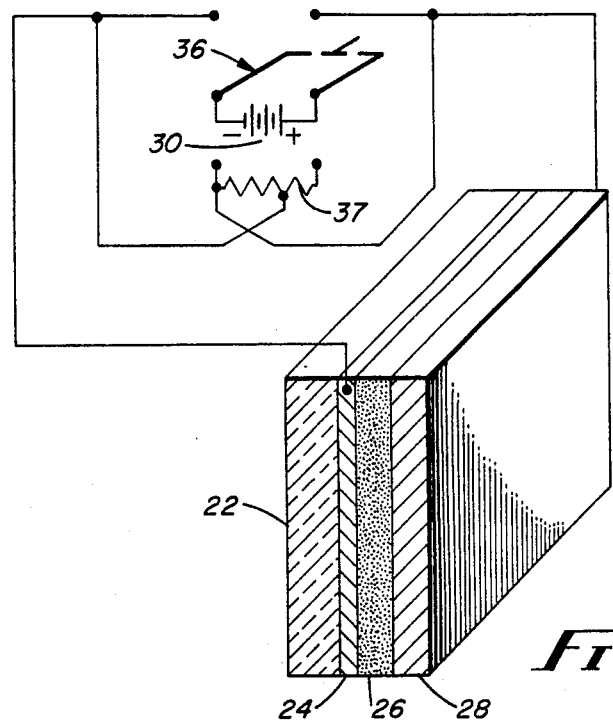

Turning now to the drawings, FIG. 1 illustrates a device in accordance with the teaching of the above mentioned prior application Ser. No. 530,086 and the continuation-in-part application thereof. On a substrate 22 such as glass or other transparent material, are successively deposited layers of a conductive material 24, a persistent electrochromic material 26, and a second conductive material 28. At least one of conductive materials 24 and 28 is of optical quality effective for viewing or otherwise sensing the electrochromic change. The substrate 22 and the conductive layer 24 may conveniently be provided as a unit by so-called "NESA" glass, a commercially available product having a transparent coating of conductive tin oxide on one surface of a glass sheet. The layers 26 and 28 may then be deposited on the tin oxide layer by known vacuum deposition techniques. In the prior applications, the persistent electrochromic material is tungsten oxide or molybdenum oxide in the specific examples described and the outer electrode 28 is a gold film. A source of d.c. potential 30 is coupled between the conductive films with its negative terminal on the tin oxide layer and its positive terminal on the gold outer layer in order to color the device.

As described in the earlier application, when the electric field is applied between the electrodes, a blue coloration of the previously transparent sandwich occurs, i.e., the persistent electrochromic layer becomes absorptive of electromagnetic radiation over a band encompassing the red end of the visible spectrum, thereby rendering it bluish in appearance. Prior to the application of the electric field, it was essentially non-absorbent and thus transparent.

As noted briefly hereinabove, although the device of the prior application is quite effective in producing a change in coloration upon application of the electric field it suffers from a shortcoming that restricts its field of use. Specifically the coloration is slow and non-uniform when applied to a large area.

These shortcomings are solved by means of the present invention as illustrated in FIG. 2 and 3. With reference to FIG. 2, 40 is a substrate or backing material over-laid with a conductive layer 41. The substrate 40 and the conductive layer 41 may conveniently be provided as a unit by so-called "NESA" glass, a commercially available product having a transparent coating of conductive tin oxide on one surface of the glass sheet. On conductive layer 41 or other transparent material such as NESA glass, is deposited a layer of a persistent electrochromic material 42 for example by vacuum evaporating tungsten oxide to form a film 42 of thickness in the range of about 1 micron. Overlaying and in contact with film 42 is a gasket 43 of about 3mm in thickness formed from an electrically insulating material. With reference to FIG. 3, the gasket 43 separates the film 42 from a glass cover plate 44 and produces a space for the liquid electrolyte 45. In one side of the electrolyte chamber 45 is incorporated a metal counter electrode 46. In FIG. 3 the electrode 46 comprises a porous lead plate held against the plate glass 44 and the gasket 43 and dipping into the electrolyte 45.

The metallic strip 48, makes intimate contact with the bottom of the tin oxide layer of the conducting glass. A source of d.c. potential is coupled between the metallic strip 48 and the porous lead plate 46 with its positive terminal connected to the metallic strip 48 and its negative terminal connected to the porous lead electrode 46 to produce the uncolored state.

The device of the instant disclosure is arranged in a circuit to permit the device to function effectively in a reversible manner. For this purpose, as shown in FIG. 1 the battery 30 is coupled to the conductive materials 46 and 48 through a reversing switch indicated generally at 36. As shown, with the switch arm in the position to produce coloration, the positive terminal of the source is connected to the outer or gold electrode while the negative terminal is connected to the tin oxide layer on the glass substrate.

Once complete coloration is induced, the switch 36 may be opened, disconnecting the battery from the device entirely, and the device will remain in its darkened state without further application of power.

To bleach or erase a previously darkened surface, the switch arm is thrown to the "bleach" contacts, across which is connected a potentiometer 37. As shown, the potentiometer contact or slider is movable from a point at which the conductors 24, 28 are short circuited to a point at which full battery voltage, of polarity opposite to the coloration condition, is applied between them. Any number of reverse voltage values may be obtained between the two extremes.

In the position illustrated in the drawing, a "bleach" voltage of a value less than battery voltage is applied across the electrodes, setting up a corresponding electric field. Under the influence of this field, the device returns to its initial uncolored state. The rapidity with which the bleaching occurs is determined by the magnitude of the voltage; the higher the voltage, the faster the bleaching process is completed.

The following examples illustrating a particular application of the present invention, are not to be construed as a limitation on the invention except as defined in the appended claims.

EXAMPLE 1

A film of tungsten oxide about 1.0 micron in thickness is vacuum-deposited on a carefully cleaned 12 × 12 inch conductive glass substrate (NESA glass). A gasket of insulating material about 3 mm thick is then placed over the substrate around the sides of the film and incorporating on one side a porous lead electrode in contact with the electrolyte. The cavity so formed is enclosed by a transparent glass cover plate in a sandwich type cell arrangement.

In order to color the tungsten oxide film in contact with the electrolyte the electrical leads to the cell are connected to an external power source. The lead plate is made positive.

The coloration of the electrochromic film is achieved by applying to the electrochromic cell a potential of about 0.7 volt and current of 30 milliamperes. Rapid and even coloration of the electrochromic film occurs over the entire glass area, and is complete within 5 minutes. With the electric field removed from the cell, the electrochromic image is substantially permanent.

The window can be bleached completely within the same time interval by reversing the polarity of the applied potential.

EXAMPLE 2

A film of tungsten oxide 0.5 microns in thickness was employed in a 6 × 6 inch window cell containing 8 molar sulfuric acid. The electrochromic layer self colored on short circuit to about 30% transmission in the center within 1 minute. The degree of coloration was easily controlled and the entire viewing area developed an even coloration. Upon reversing the polarity, thus making the electrochromic film positive, the colored film bleached completely with 3 minutes at a constant potential of 1 volt. The cell underwent 2500 cycles over a period of 10 days. The film was still clear and performed well.

EXAMPLE 3

A device suitable for information display, constructed as in Example 2 and having an area of 2 × 2mm was colored in about 1 second under the same conditions and bleached in the same time interval.

EXAMPLE 4

A device was constructed similar to that of Example 1 using a layer of molybdenum oxide instead of tungsten oxide. The device operated under the same conditions with similar coloration and bleach results.

I claim:

1. A variable light transmission device which comprises in combination a layer of a solid persistent electrochromic material in contact with a separate layer of liquid electrolyte, said layer of liquid electrolyte and said layer of solid electrochromic material being disposed between and each contacting one of a pair of conductive electrodes.

2. The device of claim 1 wherein the electrochromic material contains at least one element of variable oxidation state.

3. The device of claim 1 wherein the liquid electrolyte is a strong sulfuric acid solution.

4. The device of claim 1 wherein the liquid electrolyte is in coextensive contact with the electrochromic material.

5. The device of claim 1 wherein at least one of the electrodes is substantially transparent.

6. A device as in claim 5 wherein the counter electrode is positioned so that light may pass through at least part of said transparent electrode.

7. The device of claim 1 wherein said persistent electrochromic material is tungsten oxide.

* * * * *